(12) United States Patent
McNair et al.

(10) Patent No.: US 8,856,156 B1
(45) Date of Patent: Oct. 7, 2014

(54) ONTOLOGY MAPPER

(71) Applicant: Cerner Innovation, Inc., Lenexa, KS (US)

(72) Inventors: Douglas S. McNair, Leawood, KS (US); John Christopher Murrish, Overland Park, KS (US); Kanakasabha Kailasam, Olathe, KS (US)

(73) Assignee: Cerner Innovation, Inc., Kansas City, KS (US)

( * ) Notice: Subject to any disclaimer, the term of this patent is extended or adjusted under 35 U.S.C. 154(b) by 181 days.

(21) Appl. No.: 13/645,896

(22) Filed: Oct. 5, 2012

Related U.S. Application Data

(60) Provisional application No. 61/544,919, filed on Oct. 7, 2011.

(51) Int. Cl.
*G06F 17/30* (2006.01)
(52) U.S. Cl.
CPC .............................. *G06F 17/30011* (2013.01)
USPC ........... 707/756; 707/755; 707/791; 707/602; 707/608
(58) Field of Classification Search
CPC .......... G06F 17/2785; G06F 17/30734; G06F 17/30731; G06F 19/345
USPC .................... 707/756, 755, 791, 740
See application file for complete search history.

(56) References Cited

U.S. PATENT DOCUMENTS

| | | | |
|---|---|---|---|
| 4,839,853 A | 6/1989 | Deerwester et al. | |
| 5,301,109 A | 4/1994 | Landauer | |
| 6,654,740 B2 | 11/2003 | Tokuda et al. | |
| 6,996,575 B2 * | 2/2006 | Cox et al. | 707/739 |
| 7,039,634 B2 | 5/2006 | Xu et al. | |
| 7,120,626 B2 | 10/2006 | Li et al. | |
| 7,440,947 B2 | 10/2008 | Adcock et al. | |
| 7,529,765 B2 | 5/2009 | Brants et al. | |
| 7,558,778 B2 | 7/2009 | Carus et al. | |
| 7,844,449 B2 | 11/2010 | Lin et al. | |
| 7,844,566 B2 | 11/2010 | Wnek | |
| 2010/0185685 A1 | 7/2010 | Chew et al. | |
| 2012/0173475 A1* | 7/2012 | Ash et al. | 707/600 |
| 2013/0046558 A1* | 2/2013 | Landi et al. | 705/3 |
| 2013/0197938 A1* | 8/2013 | Bayouk et al. | 705/3 |

\* cited by examiner

*Primary Examiner* — Debbie Le
(74) *Attorney, Agent, or Firm* — Shook, Hardy & Bacon LLP

(57) ABSTRACT

Systems, methods and computer-readable media are provided for facilitating patient health care by providing discovery, validation, and quality assurance of nomenclatural linkages between pairs of terms or combinations of terms in databases extant on multiple different health information systems that do not share a set of unified codesets, nomenclatures, or ontologies, or that may in part rely upon unstructured free-text narrative content instead of codes or standardized tags. Embodiments discover semantic structures existing naturally in documents and records, including relationships of synonymy and polysemy between terms arising from disparate processes, and maintained by different information systems. In some embodiments, this process is facilitated by applying Latent Semantic Analysis in concert with decision-tree induction and similarity metrics. In some embodiments, data is re-mined and regression testing is applied to new mappings against an existing mapping base, thereby permitting these embodiments to "learn" ontology mappings as clinical, operational, or financial patterns evolve.

20 Claims, 13 Drawing Sheets

```
ONTOLOGY MAPPER – DTI EXAMPLE
[CLASS 0 = NOT SEPSIS; CLASS 1 =
            SEPSIS]
-----  Trial 0:  -----
Rule 0/1: (134, lift 1.3)
      SBP > 108
      -> class 0  [0.993]

Rule 0/2: (46/1, lift 3.8)
      SBP <= 108
      -> class 1  [0.958]

Default class: 0

-----  Trial 1:  -----

Rule 1/1: (148.4/3.8, lift 1.2)
      HR <= 88
      -> class 0  [0.968]

Rule 1/2: (31.6/1.5, lift 4.9)
      HR > 88
      -> class 1  [0.925]

Default class: 0

-----  Trial 2:  -----

Rule 2/1: (130/8, lift 1.4)
      TEMP > 36
      -> class 0  [0.932]

Rule 2/2: (50/1.1, lift 3.0)
      TEMP <= 36
      -> class 1  [0.959]

Default class: 0

-----  Trial 3:  -----

Rule 3/1: (106.9/26.3, lift 1.7)
      SBP <= 108
      -> class 1  [0.749]

Rule 3/2: (73.1, lift 1.8)
      SBP > 108
      -> class 0  [0.987]

Default class: 0
```

*FIG. 3A.*

ONTOLOGY MAPPER – DTI EXAMPLE
[CLASS 0 = NOT SEPSIS; CLASS 1 = SEPSIS]

```
-----   Trial 4:   -----

Rule 4/1: (121.9/8.2, lift 1.4)
      WBC <= 12.3
      HR <= 92
      ->  class 0  [0.925]

Rule 4/2: (41.7/2.4, lift 2.6)
      WBC > 12.3
      ->  class 1  [0.922]

Rule 4/3: (36, lift 2.7)
      HR > 92
      ->  class 1  [0.974]

Default class: 0

-----   Trial 5:   -----

Rule 5/1: (75.8, lift 1.5)
      SBP > 108
      ->  class 0  [0.987]

Rule 5/2: (104.2/44.5, lift 1.7)
      SBP <= 108
      ->  class 1  [0.571]

Default class: 0

-----   Trial 6:   -----

Rule 6/1: (120.7, lift 1.4)
      WBC > 3.9
      HR > 60
      HR <= 84
      ->  class 0  [0.992]

Rule 6/2: (38.6/8.3, lift 2.8)
      HR > 84
      ->  class 1  [0.770]

Rule 6/3: (21.7, lift 3.5)
      WBC <= 3.9
      ->  class 1  [0.958]

Rule 6/4: (13.7/1.3, lift 3.1)
      HR <= 60
      ->  class 1  [0.852]

Default class: 0
```

*FIG. 3B.*

ONTOLOGY MAPPER – DTI EXAMPLE
[CLASS 0 = NOT SEPSIS; CLASS 1 = SEPSIS]

```
----- Trial 7: -----

Rule 7/1: (151.6/9.6, lift 1.2)
      WBC > 3.9
      HR <= 92
      -> class 0  [0.931]

Rule 7/2: (17.5, lift 4.5)
      HR > 92
      -> class 1  [0.949]

Rule 7/3: (16.6, lift 4.5)
      WBC <= 3.9
      -> class 1  [0.946]

Default class: 0

----- Trial 8: -----

Rule 8/1: (110.7/39.3, lift 1.6)
      SBP <= 108
      -> class 1  [0.643]

Rule 8/2: (69.3, lift 1.6)
      SBP > 108
      -> class 0  [0.986]

Default class: 0

----- Trial 9: -----

Rule 9/1: (111.7, lift 1.5)
      TEMP > 36
      HR <= 88
      -> class 0  [0.991]

Rule 9/2: (34.2/3.3, lift 2.7)
      TEMP <= 36
      -> class 1  [0.881]

Rule 9/3: (36.8/6.4, lift 2.5)
      HR > 88
      -> class 1  [0.809]

Default class: 0
```

*FIG. 3C.*

DISCERN ONTOLOGY MAPPER DTI EXAMPLE STATISTICAL
DISTRIBUTIONS (CLASS 0 = NOT SEPSIS; CLASS 1 = SEPSIS)
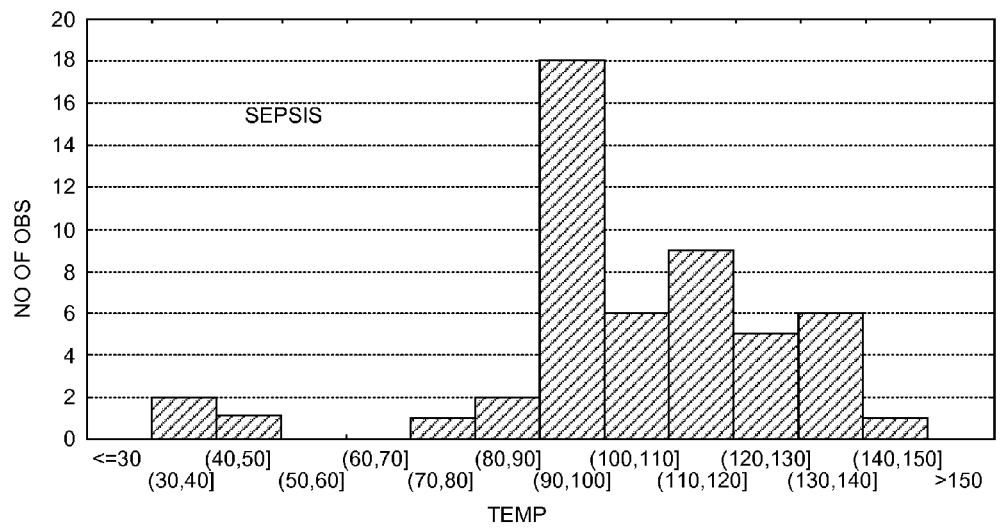
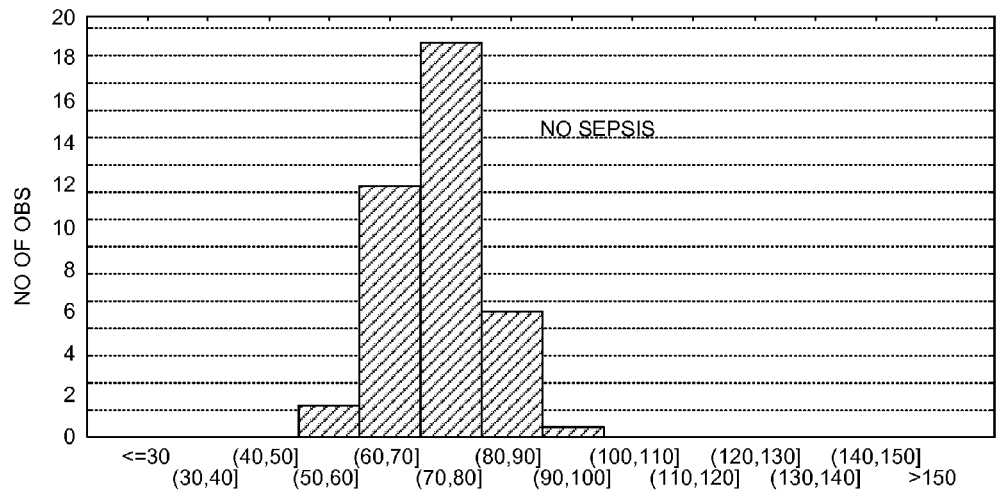
FIG. 4C.

FIG. 5A. EXAMPLE WORD-DOCUMENTS CO-OCCURRENCE MATRIX

FIG. 5B. EXAMPLE SINGULAR VALUE DECOMPOSITION (SVD)

ONTOLOGY MAPPER

CROSS-REFERENCE TO RELATED APPLICATIONS

This application claims the benefit of U.S. Provisional Application No. 61/544,919, titled "Ontology Mapper," filed Oct. 7, 2011, which is hereby expressly incorporated by reference in its entirety.

INTRODUCTION

Demands for transportable, readily-available, interoperable electronic health care records have steadily increased in recent years. Demographic changes such as an aging population with increased chronic illness and a more mobile population have created needs for larger volumes of health information that are more easily transferable, particularly to support safe and effective longitudinal individual care regardless where the consumer may be when a medical problem arises. Furthermore, concerns about viral epidemic outbreaks and bioterrorism have focused attention on the need for a public health information infrastructure with the capability of providing aggregated population-level information on a real-time basis. The delivery of cost-effective, high quality health care in order to meet societal goals for healthy people and healthy populations is thus now clearly linked to the availability and interoperability of health information.

In November of 2001 the U.S. National Committee on Vital and Health Statistics (NCVHS) issued a report to the Secretary of Health and Human Services that called for establishing a National Health Information Infrastructure (NHII). However, the proposed U.S. National Health Information Infrastructure (NHII) did not describe a centralized database of patient information. Rather, the NHII vision is for distributed health information built on a framework within secure networks with strict confidentiality protections and a unified nomenclature coding system.

Besides the demands for accessible, geographically-distributed, interoperable information that pertains to the safe and effective longitudinal care of individuals, there are growing demands for large-scale and ongoing comparative-effectiveness research, to ascertain the relative value and effectiveness of various different modalities of medical treatments and to evaluate this in a timely manner. Traditionally, randomized controlled clinical trials have been the "gold standard" for such research. However, the rate of year-to-year change in the myriad of treatments that are available for many thousands of important medical conditions is very high, and it is logistically and financially impossible for health authorities to design and fund and conduct all of the prospective randomized trials that are in principle desirable, for health policy and treatments' scientific relative value determinations to keep pace with innovations and with evolving de facto treatment practices.

In some instances, equipoise is absent and it may be unethical to conduct individually randomized prospective studies in the traditional manner. 'Equipoise' is the term used for a state of lack of evidence regarding which treatment intervention or innovation will provide the most benefit and the least harm to recipients. If in advance of commencing a study one already has evidence that Treatment A is more safe or effective than Treatment B, then equipoise is absent, and it would be unethical to expose more persons to the harms of the inferior B simply to find out quantitatively how much worse B is, or to accomplish some other objective.

In these and other circumstances, data mining and observational empirical research using case-control designs or prospective cohort research designs are solutions to the costs and limitations of traditional randomized controlled trials. But in order to conduct observational and data mining-based studies, it is necessary that the like data elements in each computer system that sources data to be analyzed be mapped or linked to like data elements in each other system. But the ability to reliably measure quality from unmapped electronic medical record data is lacking.

Presently, health information is typically maintained in multiple electronic health-record database systems, as well as in traditional paper records, in many locations for each patient, including: physician offices, laboratories, hospitals and departments within hospitals (e.g., radiology departments), with post-acute care providers such as nursing homes and home health agencies, and, increasingly, with the consumer, in separately-managed personal health records systems.

People who have chronic health conditions and may be transferred to and from providers across the health care continuum over a period of time have a great need for interoperability of their health information that is stored within the disparate systems. Recent enactment of health reform legislation aims to improve transfer and availability and interoperability of health information through means such as 'Clinical Document Architecture' (CCD) and 'Continuity of Care Document' (CCD) standards. A CCD standard was originally developed by HL7 with participation from ASTM International's "E31" standards committee, the technical committee responsible for development and maintenance of the 'Continuity of Care Record' (CCR) standard.

Essentially, a clinical document architecture (CDA) standard is necessary to enable the reliable algorithmic location of pertinent information within current documents, to logically organize documents in document management systems, to categorize and link information within the documents according to a defined structure, and to retrieve and display documents in electronic systems (including web-based and wireless mobile systems). While there has been considerable progress in recent years with regard to CDA and 'continuity of care document' standards, there has been little progress to achieve a unified ontology or universal nomenclature or to insure the integrity of mappings between various existing nomenclatural rubrics.

Despite the multi-year federally-sponsored efforts at standardizing the health information exchange record architecture and unifying the nomenclatures that are presently utilized within the different systems to record diagnoses, diagnostic and therapeutic procedures, pharmaceuticals, and other items, there is as yet no universally-accepted ontology or nomenclature standard for all of the domains and disciplines, and, lacking such universal standard, the organizations persist in employing the nomenclatures that they have used for many years, according to the traditions and requirements of insurance companies and payors with whom they interact, plus requirements set forth by a miscellany of state and local agencies. There is as yet no regulation or other mandate that compels the organizations to conform to one unified set of nomenclatural rubrics such that like terms assuredly refer to the same data elements across disparate computer systems, and, even were the organizations compelled to conform to some future standard yet to be promulgated, there are at this time insufficient monies and resources to implement prompt migration to a universal unified ontology.

Consequently, the absence of unified nomenclature and the financial and other impediments to creating one mean that (1)

inter-systems interoperability nomenclature-linkage means to support health services statistical and observational research and policy setting, and (2) inter-systems interoperability means to support real-time decision-support for the care of individual patients, remain unmet needs.

SUMMARY

Systems, methods and computer-readable media are provided for facilitating patient health care by providing discovery, validation, and quality assurance of nomenclatural linkages (also called 'mappings' or 'cross-walks') between pairs of terms or, alternatively, combinations of terms ('morphemes' or 'term-clusters') in databases that are extant on multiple different health information systems that do not share a set of unified codesets, nomenclatures, or ontologies to tag or code the documents and records, or that may in part rely upon unstructured free-text narrative content instead of codes or standardized tags. Embodiments discover semantic structures that exist naturally in the documents and database records maintained by those systems, including relationships of synonymy and polysemy between terms used in said documents and database records arising from disparate processes and maintained by different information systems. Some embodiments then utilize the discovered latent semantic structures to establish linkages between terms extant on the multiple systems or to validate linkages that have been established in other ways, either by manual human effort or by other algorithmic means. In some embodiments, a process for automatically discovering and validating mappings, including freetext and codesets, is carried out using Latent Semantic Analysis (LSA) in concert with decision-tree induction and Pearson correlation coefficient, Salton's cosine, other lexical distance metrics, or suitable similarity metrics. Additionally, in some embodiments, data is re-mined and regression testing is applied to new mappings against an existing mapping base, thereby permitting these embodiments to "learn" ontology mappings as clinical, operational, or financial patterns evolve.

BRIEF DESCRIPTION OF THE DRAWINGS

Embodiments are described in detail below with reference to the attached drawing figures, wherein:

FIGS. 3A, 3B, and 3C provide example Decision Tree Induction (DTI) rules for an embodiment of an Ontology Mapper with a use-case context of sepsis;

FIGS. 4A, 4B, and 4C provide example statistical distributions of sepsis occurrence used in an embodiment of an Ontology Mapper decision tree;

FIG. 5A shows an example matrix of word-documents co-occurrence;

FIG. 5B shows an example of singular value decomposition (SVD) applied to the example matrix of FIG. 5A;

DETAILED DESCRIPTION

Figure 1A:
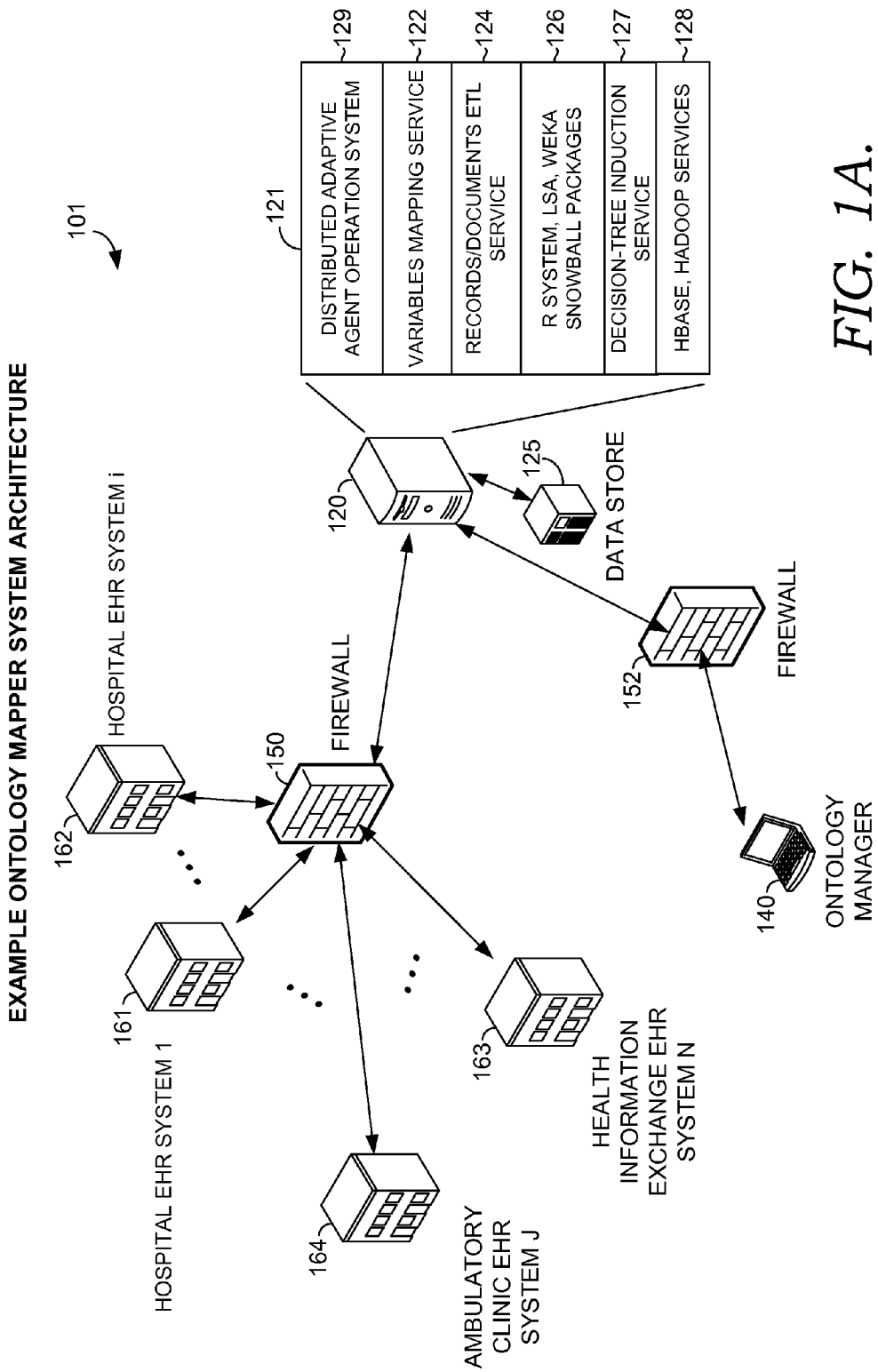
FIGS. 1A, 1B, and 1C depict aspects of an illustrative operating environment suitable for practicing embodiments of the invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As one skilled in the art will appreciate, embodiments of our invention may be embodied as, among other things: a method, system, or set of instructions embodied on one or more computer readable media. Accordingly, the embodiments may take the form of a hardware embodiment, a software embodiment, or an embodiment combining software and hardware. In one embodiment, the invention takes the form of a computer-program product that includes computer-usable instructions embodied on one or more computer readable media.

Computer-readable media include both volatile and non-volatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

By way of background, an increasing number of applications are being developed for automated analysis of medical-related data. Techniques have been developed, for example, for receiving a triggering or new 'evoking' data item, evaluating premises of medical evidence in the context of that evoking item or event using decision-support inference engine software or artificial neural network algorithms or other means, identifying such features and classifying the features for possible diagnosis and treatment, and emitting alerts and advisory messages to the human user or undertaking action automatically. These clinical decision support (CDS) systems have become increasingly prevalent within individual institutions, such as hospitals. However, relatively modest inter-institutional interoperability of such programs has occurred in the past, due to the absence of interoperable or linked ontologies, and little or no activity has focused on enhancing the performance of such algorithms by novel machine-learning techniques applied across multiple venues of care, utilizing CCD or CDA information from the different information systems that are used in the various venues.

Moreover, present CDS systems are typically refined by laborious and expensive feature recognition and expert-system reprogramming by teams of programmers and technicians.

There is a need, therefore, for an improved technique that would permit efficient, affordable, interoperable refinement of statistical and epidemiologic data analysis and CDS in the multi-venue, multi-system health care context. The benefits for various stakeholders include at least the following:

For Consumers: (a) realtime medical consultations and decision-support wherever the person is located; and (b) management of one's own health care needs and their health care decision making.

For Providers: (a) providing access to more accurate and complete real-time patient data; (b) using clinical guidelines and protocols that reference current and historical information from disparate systems concurrently with the patient care process; (c) preventing adverse events by providing realtime CDS actions or alerts to clinicians integrated with the patient care process workflow; and (d) supporting continuous quality improvement processes by providing more complete and comprehensive clinical data for outcomes analysis.

For Public Health Officials or Regulators: (a) improving the ability to identify, monitor, and respond to health problems; (b) accessing and reporting data needed for public health; and (c) increasing the scope, effectiveness, timeliness, and efficiency of clinical research.

Data exploration (sometimes called "data mining") involves the development and use of tools that analyze large data sets in order to extract useful, but often hidden (or "latent") information from them. Information extracted from a particular database can be used to identify patterns of characteristics (features) and groupings (classes) of samples in the data. If the feature patterns of samples in each class are sufficiently similar within that class and are sufficiently dissimilar to the overall feature patterns of the other classes, then the feature patterns of each class may be used to develop classification rules for separating the different classes within that domain. The resulting classification rules may then be used to predict to which class a new and unclassified sample may belong based upon that new sample's feature pattern. A linkage "classifier" is the culmination of such classification rules that are generated from input data called a training set.

Classification techniques often include some kind of data exploration method that derives the classification rules. However, conventional classification methods are all affected by one or more of three factors: (1) lack of interpretability, (2) assumptions made about the data when building a classifier, and (3) data requirements. The first factor is a question of how semantically interpretable the variables' provenance and modes of measurement are. In some cases, such as blood pressure monitoring, it is vital that a user be able to understand exactly what factors will allow discrimination between a blood pressure that is measured by a sphygmomanometer cuff and a blood pressure that is measured by an indwelling arterial line. In other situations, however, the distinction is of no importance and, therefore, the semantic interpretability is not as important an influence on the choice of classification method. The second factor limits the usefulness of the resulting classifier if the assumptions made when applying the classification technique are inappropriate for the given data set. The third factor affects those classification methods that require a specific size data set, or require the classes to have equivalent properties in terms of membership number or other properties such as covariance structure.

Moreover, conventional classification techniques include additional limitations, including:

(1) Labor-intensiveness, giving rise to excessive costs to develop and maintain or, conversely, giving rise to excessive false-miss Type II statistical error rates due to staleness of mappings if the mappings are not maintained on a timescale commensurate with rates of nomenclatural change in the underlying associated systems.

(2) Poor scalability, causing excessively slow response-time and/or unacceptable computer hardware expense to achieve a desired level of runtime performance. In some instances, outstripping the maximum address space in terms of physical memory and/or pagefile virtual memory.

(3) Failure to take into account the topic-scoped, context-dependent epidemiology of terms' values and the quantitative properties of statistical distributions of those values.

(4) Lack of ability to adequately reduce the dimensionality of the classification problem, such that statistical associations between terms that have large statistical explanatory power are diluted or obscured by retained 'noise' variables.

Failure types (3) and (4) result in (a) an inability to accurately and reliably establish linkages when such true linkages are latent in the underlying data, and (b) a high level of statistical uncertainty regarding the veracity and strength of such linkages, such that a very large sample size or data set is required to provide statistical power sufficient to resolve the uncertainty.

(5) Lack of practical feasibility to perform repeated regression testing and related quality-assurance procedures to determine the veracity and reliability of inter-nomenclatural linkages and mappings (6) Lack of ability to quickly and sensitively discover new valuable statistical associations and linkages that exist between terms that are extant in multiple disparate databases.

(7) Lack of robustness against idiosyncratic and regional variations in the use and application of terms to situations that are conceptually and semantically similar.

Accordingly, there is a need, for an improved technique that provides efficient, affordable, interoperable refinement of statistical and epidemiologic data analysis and CDS in the multi-venue, multi-system health care context.

At a high level, we provided a technology for facilitating patient health care by, among other things, addressing problems associated with the automatic, algorithm-guided mapping of semantically identical terms between and among two or more information systems. Embodiments provide for the automatic discovery, establishment, and statistical validation of linkages between a plurality of different nomenclatures employed by a plurality of information systems, such as multiple electronic health record systems. The imputation of latent semantic structures in corpora comprised of samples of historical records from each system enables automated terminology mapping between disparate systems' records, to establish reliable linkages that may subsequently be utilized for realtime decision support, data mining-based research, or other valuable purposes.

The phrase "terminology coding systems" refers to the continuum of approaches used to assure standardized recording and encoding of clinical data in electronic record systems. Such coded data is central to the efficient exchange of information in messages sent across documents, systems and applications. Various types of terminology coding systems exist on a continuum that ranges from human readable, enumerated coding schemes to formal terminologies that enable machine "understanding."

Enumerated coding schemes emphasize encoding pre-coordinated phrases that enable users to pick the most relevant terms from pre-defined lists. Typically, such systems provide a very limited coverage of clinical content, and focus only on the specific use for which those data are required. Such systems reflect the technology available 30 years ago and the constraints that were present in relation to coding data for computer-based analysis. The MDS is an example of an enumerated coding scheme. The enormous collection of such single-purpose, stand-alone coding systems has created a situation often compared to the Tower of Babel, where different data sets and software applications are not able to meaningfully exchange or reuse data and information.

More recent research and development initiatives in electronic health records emphasize the use of formal terminologies. Formal terminology systems emphasize the indexing and retrieval of concepts and their associated terms, and the post-coordination of phrases.

Between the enumerated classification systems and formal terminologies that anchor this continuum are other types of terminology coding systems such as nomenclatures, classifications, and taxonomies. Each is differentiated by the nature of the organization of terms within the system and the concept orientation of the coding system. It is important to recognize that the development of more complex types of terminology systems is in large part enabled by the development of technologies that enable more complex data structures and the development and use of description logics based on first order logic as a foundation for the algorithms that enable the semantics or "machine understanding" of text. The Systematized Nomenclature of Medicine Clinical Terms (SNOMED CT, which is accessible at http://www.snomed.org/) is one of the most extensively developed terminologies of this type. The pre-coordinated term "pneumonia due to *Klebsiella pneumoniae*" is equivalent to a phrase that could be post-coordinated using the following SNOMED CT codes: 56415008 "*Klebsiella pneumoniae*" and 233604007 "pneumonia".

The relationship of messaging standards, document architecture, and coded terminology systems and formalisms is equivalent to thinking about the grammar that enables us to put words together in order to communicate ideas.

Compared to traditional techniques, the present technology allows scalable automatic discovery and processing of semantic structures.

In comparison with manual methods, automated methods offer advantages in terms of absolute repeatability of mappings, immunity from errors related to database coordinator fatigue, lapses of attention, and transcription, as well as efficiency and cost considerations that permit either more extensive and rigorous testing for the same cost as manual methods, or more rapid quality assurance and validation testing at lower cost.

Figure 1B:
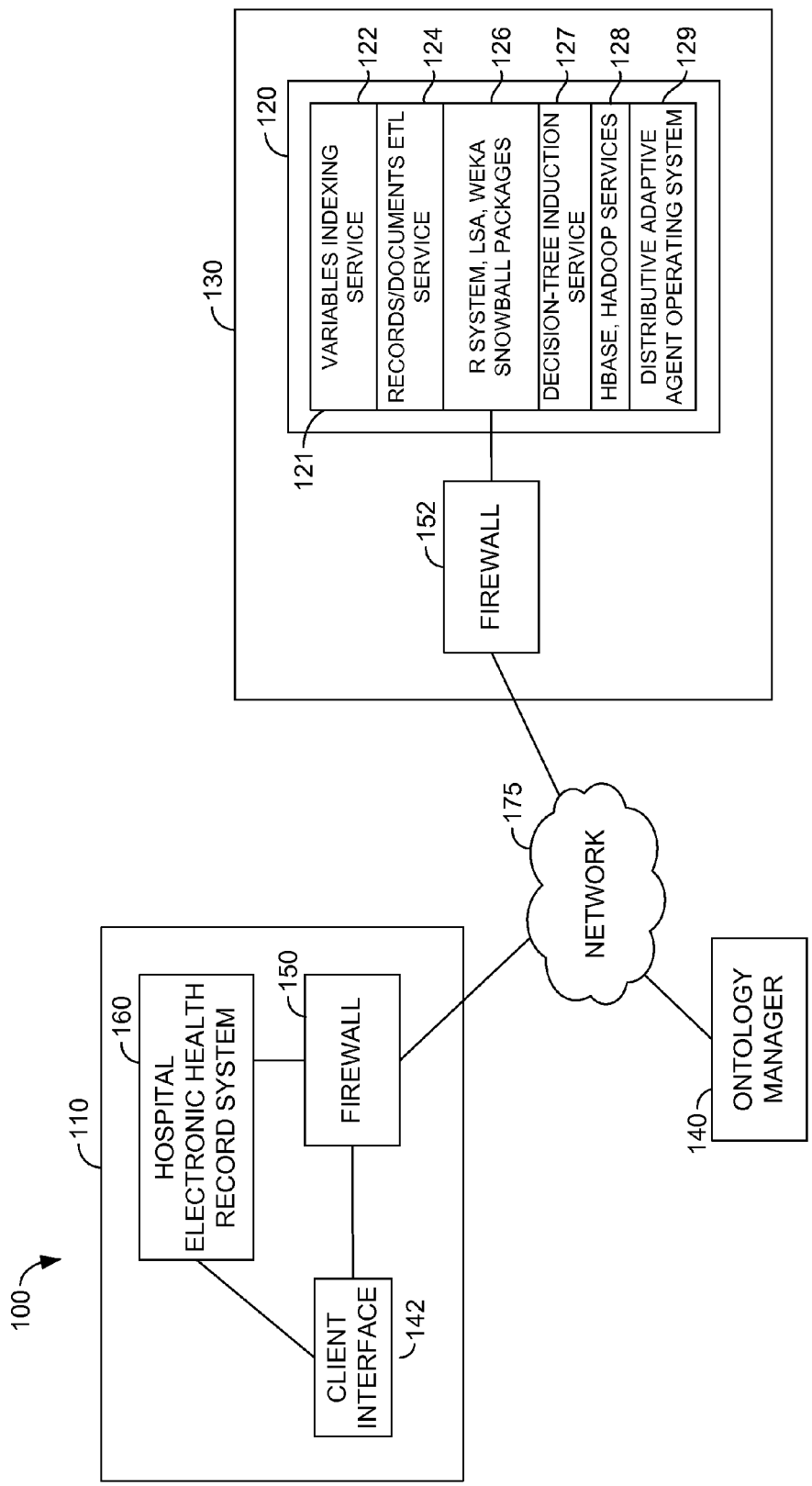

Turning now to FIGS. 1A and 1B, there is presented example operating environments suitable for practicing embodiments of the invention. With reference to FIG. 1A, example operating environment 101 includes a computerized system for compiling and running an embodiment of an ontology mapping service. In this example operating environment, one or more electronic health record (EHR) systems such as Hospital EHR System 161, Hospital EHR System 162, Ambulatory Clinic EHR System 164, and Health Information Exchange EHR System 163, are communicatively coupled to a network behind firewall 150, which is communicatively coupled to computer system 120. In embodiments, components of 101 are communicatively coupled over a local or distributed network (not shown) such as the Internet, a public network, or a private network. Embodiments of electronic health record (EHR) systems 161, 162, 163, and 164 include one or more data stores, such as data store 125, of health records and may further include one or more computers or servers that facilitate the storing and retrieval of the health records. Firewall 150 may comprise a separate firewall associated with each EHR system, in some embodiments. Furthermore, in some embodiments, one or more EHR systems may be located in the cloud or may be stored in data stores that are distributed across multiple physical locations. In some embodiments, EHR systems further include record systems which store real-time or near real-time patient information, such as wearable, bedside, or in-home patient monitors, for example.

Example operating environment 101 further includes computer system 120, which may take the form of a server, which is communicatively coupled through firewall 150 to EHR systems 161, 162, 163 and 164, and also through firewall 152 to ontology manager 140. In embodiments, ontology manager 140 may take the form of a software application operating on one or more mobile computing devices, tablets, smartphones, front-end terminals in communication with back-end computing systems, laptops or other computing devices. In some embodiments, ontology manager 140 includes a Web-based application or collection of applications that is usable to manage services provided by embodiments of the invention. In some embodiments, manager 140 facilitates calibration, evaluation, re-testing or tailoring of the ontology mappings. In some embodiments, manager 140 facilitates receiving feedback information from users such as an indication of the accuracy for a particular mapping, corrections to mappings, or nomenclature linkage information between pairs or among combinations of terms.

Embodiments of computer system 120 include computer software stack 121, which in some embodiments operates in the cloud, as a distributed system on a virtualization layer within computer system 120. Some embodiments of software stack 121 include a distributed adaptive agent operating system 129, which may be implemented as a platform in the cloud, and which is capable of hosting a number of services such as 122, 124, 126, 127 and 128. Embodiments of services 122, 124, 126, 127 and 128 run as a local or distributed stack in the cloud, on one or more personal computers and servers such as 120, and/or a computing device running manager 140 or interface 142 (shown in FIG. 1B). In one embodiment, manager 140 and/or interface 142 (of FIG. 1B) operate in conjunction with software stack 121.

In embodiments, variables indexing service 122 and Records/Documents ETL service 124 provide services that facilitate retrieving frequent item sets, extracting database records, and cleaning the values of variables in records. In some embodiments, these services invoke software services 126. Software services 126 perform statistical software operations, and include statistical calculation packages such as, in one embodiment, the R system (the R-project for Statistical Computing, which supports R-packages or modules tailored for specific statistical operations, and which is accessible through the Comprehensive R Archive Network (CRAN) at http://cran.r-project.org); R-system modules or packages including LSA (latent semantic analysis), Weka (Weka data mining software services) or rWeka or similar collection of machine-learning algorithms for data mining, including data pre-processing, classification, regression, clustering, and association rules, arules, and Snowball package (Snowball stemmers developed by Kurt Hornik as part of the R-Project). Embodiments of services 127 include a decision-tree induction (DTI) service, which may be implemented using Class J48, or C5 DTI (Quinlan algorithm) or similar services. In some embodiments, DTI service is carried out using a Weka package of software services 126. Software packages 126 are associated with services 128, which include Apache Hadoop and Hbase framework, or similar frameworks operable for providing a distributed file system.

Example operating environment 101 also includes data store 125, which in some embodiments includes patient data and information for multiple patients; variables associated with patient recommendations; recommendation knowledge base; recommendation rules; recommendations; recommendation update statistics; an operational data store, which stores events, frequent itemsets (such as "X often happens with Y", for example), and item sets index information; association rulebases; agent libraries, solvers, and other similar information; patient-derived data; and health care provider information, for example. In some embodiments, data store 125 comprises the data stores associated with the one or more EHR systems, such as 161, 162, 163, and 164, interface 142 (of FIG. 1B), and ontology manager 140. Further, although depicted as a single data store, data store 125 may comprise one or more data stores, or may be in the cloud.

FIG. 1B illustratively depicts another aspect of an example operating environment, referred to herein as 100. Within 100, a first premise location 110 includes a network behind firewall 150 communicatively coupled to network 175. In some embodiments, network 175 includes the Internet, a public network, or a private network. Premise location 110, which may comprise multiple separate geographical locations, further includes EHR system 160, which may comprise multiple separate EHR systems communicatively coupled through a network, such as depicted in FIG. 1A. In some embodiments, premise location 110 also includes client interface 142, which communicates with EHR system 160. In some embodiments, interface 142 takes the form of a user interface operated by a software application or set of applications on a client computing device such as a personal computer, laptop, smart phone, or tablet computing device. In one embodiment, the application includes the PowerChart solution suite, manufactured by Cerner Corporation. In one embodiment, the application is a Web-based application or applet. Interface 142 facilitates receiving information from a user or health care provider about a specific patient, a class of patients, feedback information about the accuracy for a particular mapping, corrections to mappings, or nomenclature linkage information between pairs or among combinations of terms.

Example environment 100 further includes a premise location 130 which includes computer system 120 communicatively coupled through firewall 152 to network 175. Additional numbered components of environment 200 in FIG. 1B are described in connection to FIG. 1A.

Generally, embodiments of the invention involve, or provide functionality for, obtaining records containing two or more encodings for documenting an event. Exemplary system architectures 100 and 101 facilitate obtaining records, discovering and validating relationships among the two or more encodings. In some embodiments, a server such as computer system 120, communicates through firewall 152, and remote firewall such as 150 to obtain records from an HER system, such as such as hospital health record system 1, i, j, or N represented by block 160, 161, 162, 163, or 164. In some embodiments, one or more software agents, or a user/analyst running services at computer system 120 or ontology manager 140, accesses these records and stores them in storage at data store 125, where they are accessible to server 120, ontology manager 140, or interface 142.

Figure 1C:
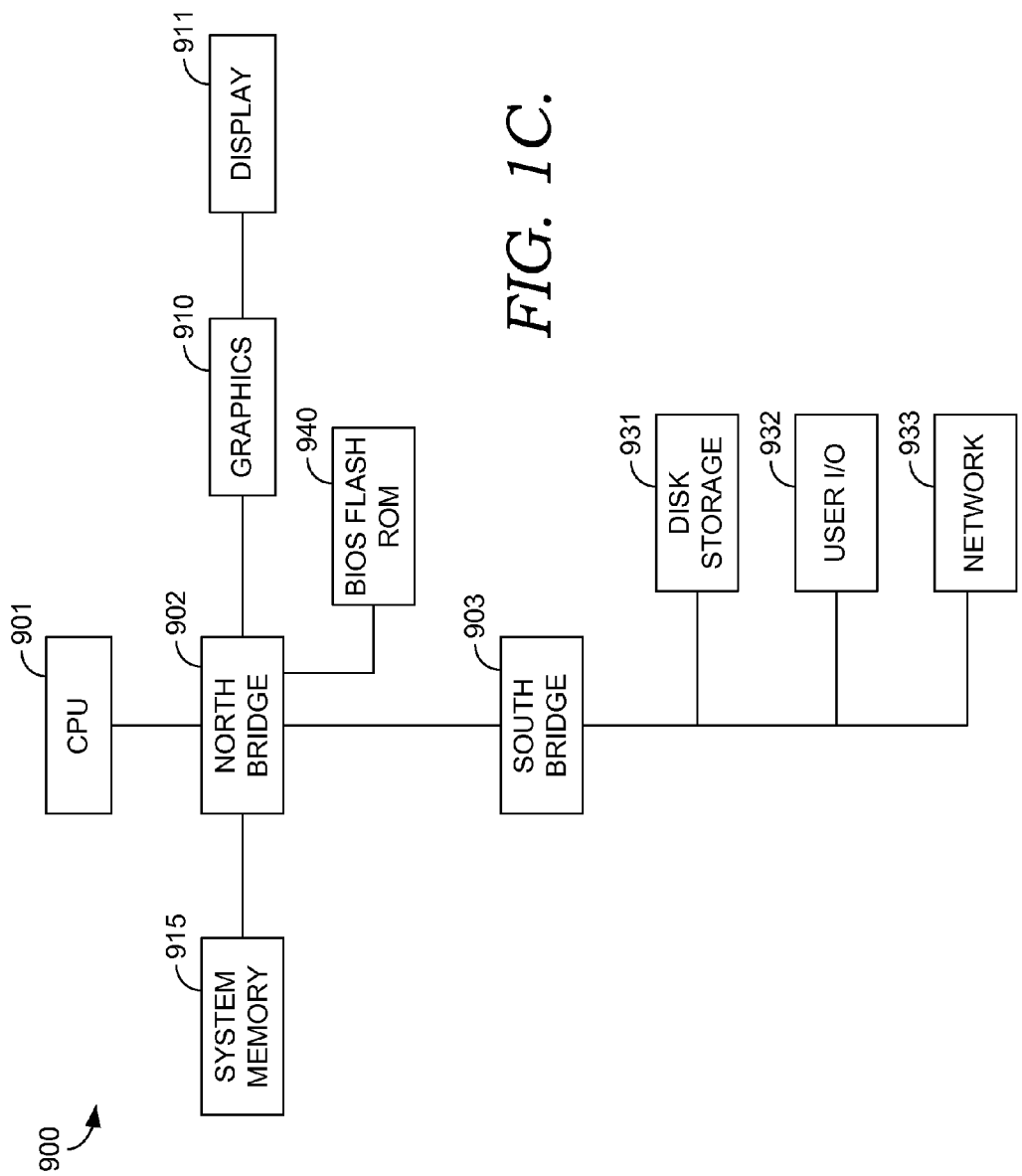

Turning now to FIG. 1C, there is shown one example of an embodiment of computer system 900 that has software instructions for storage of data and programs in computer-readable media. Computer system 900 is representative of a system architecture that is suitable for computer systems such as computer system 120 of FIGS. 1A and 1B, and the computer device(s) operating manager 140 and interface 142, in some embodiments. One or more CPUs such as 901, have internal memory for storage and couple to the north bridge device 902, allowing CPU 901 to store instructions and data elements in system memory 915, or memory associated with graphics card 910, which is coupled to display 911. Bios flash ROM 940 couples to north bridge device 902. South bridge device 903 connects to north Bridge device 902 allowing CPU 901 to store instructions and data elements in disk storage 931 such as a fixed disk or USB disk, or to make use of network 933 for remote storage. User I/O device 932 such as a communication device, a mouse, a touch screen, a joystick, a touch stick, a trackball, or keyboard, couples to CPU 901 through south bridge 903 as well. The system architecture depicted in FIG. 1C is provided as one example of any number of computer architectures, such as computing architectures that support local, distributed, or cloud-based software platforms, and are suitable for supporting computer system 120 of FIGS. 1A and 1B.

In some embodiments, computing system 900 is a computing system made up of one or more computing devices. In an embodiment, computing system 900 includes an adaptive multi-agent operating system, but it will be appreciated that computing system 900 may also take the form of an adaptive single agent system or a non-agent system. Computing system 900 may be a distributed computing system, a data processing system, a centralized computing system, a single computer such as a desktop or laptop computer or a networked computing system.

In some embodiments, computing system 900 is a multi-agent computer system with software agents. A multi-agent system may be used to address the issues of distributed intelligence and interaction by providing the capability to design and implement complex applications using formal modeling to solve complex problems and divide and conquer these problem spaces. Whereas object-oriented systems comprise objects communicating with other objects using procedural messaging, agent-oriented systems use agents based on beliefs, capabilities and choices that communicate via declarative messaging and use abstractions to allow for future adaptations and flexibility. An agent has its own thread of control which promotes the concept of autonomy. Additional information about the capabilities and functionality of agents and distributed multi-agent operating systems, as they relate to these embodiments, is provided in U.S. patent application Ser. No. 13/250,072, filed on Sep. 30, 2011, which is herein incorporated by reference in its entirety.

Figure 2:
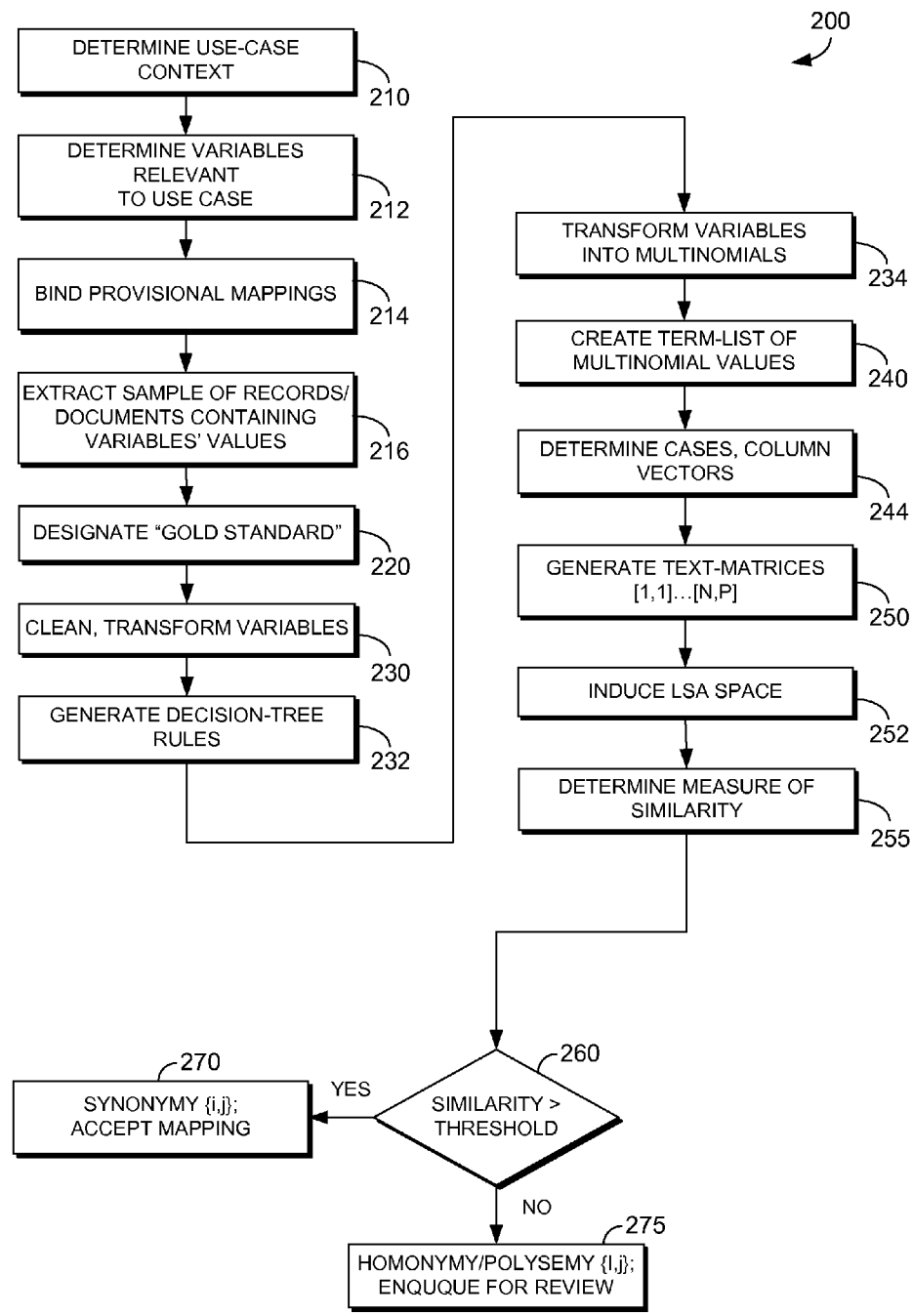
FIG. 2 depicts a flow diagram of a method for determining a mapping between terms in nomenclatures utilized by two or more health care information systems in accordance with an embodiment of the invention.

FIG. 2 provides a flow diagram of a method for determining a mapping between terms in nomenclatures utilized by two or more health care information systems, herein referred to as method 200. In particular, embodiments of method 200 include generating an LSA classifier and, in some embodiments, verifying and validating whether such a classifier achieves statistical sensitivity and specificity in the range of deployment, sufficient for satisfactory performance in the use for establishing mappings between terms in nomenclatures utilized by two or more health care information systems. In some embodiments, LSA is applied in concert with decision-tree induction and a Pearson, Salton, or other similarity metric to determine and validate mappings.

For Natural Language Queries, simple semantic term matching gives a high false negative or "miss" rate, in part due to ambiguous terms and because semantically similar queries vary due to personal styles and local idioms. But latent semantic indexing imputes 'latent semantic space' (hidden meanings) embodied by the corpora of documents or records such as unstructured documents and structured database records. Virtual or 'latent' codeset may thus be determined in unstructured text, where no coding actually exists at all. Furthermore, codesets that are used may be corroborated. The advantages of embodiments applying LSA, verses a 'bag of words' approach that matches words or terms, include that the syntax and before or after, temporal relationships manifested in the content are considered. Typically, for a given document or record, the document or record will be motivated by some domain(s) or topic(s). These topic(s) and domain(s) may be reflected in the vocabulary used or not used, or reflected in logistical, administrative, or nosologic term or code 'missingness' rates that are context sensitive. Moreover, name-value pairs can have domain- or topic-constrained statistical distributions that arise from the causes and effects of the domain or topic. Embodiments applying LSA are more effective because these factors relating to the domain or topic motivations are considered in the statistical processing and quantitative synonymy metrics for mapping carried out by the embodiments.

Embodiments of our LSA algorithm, which in some embodiments take the form of a fully-automatic statistical matrix algebra algorithm, extract and infer relations of expected contextual usage of words in corpora of records and/or documents. Further, they require no human-constructed dictionaries, codesets, knowledge bases, semantic networks, or grammars. Rather, some embodiments applying LSA take the texts and codes "as-is" and impute the semantic statistical relationships that exist 'latently' within the empirical corpora.

The term 'LS space' may be used to denote the persistent matrix representation that results from applying the LSA algorithm to a "training" dataset comprised of a sample of records and documents in the domain of interest that contain the relevant variables and their codes, discrete values, and/or text terms or morpheme multi-term composites. In some embodiments, pre-processing steps may be performed on the raw data before applying LSA. For example, pre-processing may include removing stopwords. Moreover, some embodiments apply statistical transformations to the variables numerical values. This provides the advantage of reducing variables' dynamic range and improving classifier performance.

With continuing reference to method 200 of FIG. 2, turning briefly to FIG. 5A, an example word-document co-occurrence matrix is shown, herein referred to as matrix W. Given N documents and vocabulary size M, where a 'document' can also be a concatenation of multiple RDBMS (relational database management system) records, matrix W can be generated as shown, where columns $d_1$ to $d_N$ represent documents and rows $w_1$ to $w_M$ represent the vocabulary or words/terms. If we let $c_{i,j}$ be the number of times word (or term) $w_i$ occurs in $d_j$, and $n_j$ be the total number of words (or terms) present in $d_j$, then for discriminating words (or terms), normalized entropy can be expressed as:

$$\varepsilon_i = -\frac{1}{\log N}\sum_{j=1}^{N}\frac{c_{i,j}}{t_i}\log\frac{c_{i,j}}{t_i}, \text{ where } t_i = \sum_j c_{i,j}$$

A value close to zero is more important and a value close to 1 is less important. Scaling and normalization is given as:

$$w_{i,j} = (1-\varepsilon_i)\frac{c_{i,j}}{n_j}$$

FIG. 5B illustratively depicts a step, in some embodiments, of the LSA, in which singular value decomposition (SVD) is applied to matrix W. SVD which statistically is a generalized least-squares method, captures major structural associations between words (or terms) and documents (or records), and effectively removes 'noisy' observations. SVD can be viewed as a method for rotating the axis in n-dimension space, so that the first axis runs along the direction of the largest variation among the documents. (The second dimension runs along the direction of the second largest variation, and so on.) Thus where there might exist an LS space having potentially thousands of dimensions, with each document (or record) a vector in that space, SVD projects or maps those dimensions onto a smaller number of dimensions in such a way that relative distance among vectors can be preserved. This results in a smaller number of dimensions and a vector for each document of its value for those dimensions.

As shown in FIG. 5B, the rows of U represent orthonormal documents or 'systems'; and columns of V represent orthonormal words, terms, or codes. A word vector is given as $u_i S$ and a document vector given as $v_j S$. Words close in LS space appear in similar documents, and documents close in LS space convey semantically similar meaning(s). New document can be projected in LS space and the frequency count $[d_i]$ of words (or terms) in the new document given as:

$$d = USV^T; \text{ thus, } U^T d = Sv^T$$

To measure semantic distances from existing documents in the corpus that induced the LS space:

$$\hat{d}_{LSA} = Sv^T = U^T d = \sum_i (1-\varepsilon_i)d_i u_i$$

In some embodiments, similarity between documents can be quantified by projecting them into LS space, then determining the Salton cosine measure, Pearson correlation coefficient, or other lexical distance metric, between the documents' projections. A value greater than a threshold of 0.8 implies substantially the same or high similarity. Furthermore, similarity between terms may be deduced by projecting the documents into LS space, then determining the Salton cosine measure or Pearson correlation coefficient between the terms projections. Here, a value of greater than a threshold of 0.62 implies the terms are synonyms across sources. In embodiments, Salton's cosine provides a more robust measure of pairwise synonymy of systems (documents) and the term bindings that those systems manifest. Pearson's correlation provides a more robust measure of global cross-system synonymy of terms (or codes) in the latent semantic structures in which the terms occur. For a set of N documents (including composite documents and concatenates), let $D=\{d_1,\ldots d_N\}$, the set of M terms is given as $W=\{w_1,\ldots w_M\}$, and the set of K latent classes as $Z=\{z_1,\ldots z_K\}$. For a matrix of size N*M represents the frequency counts, Pearson's correlation coefficient (commonly represented by the letter r) is sensitive to zero counts in some cells, and may provide either high or low similarities.

Figure 6:
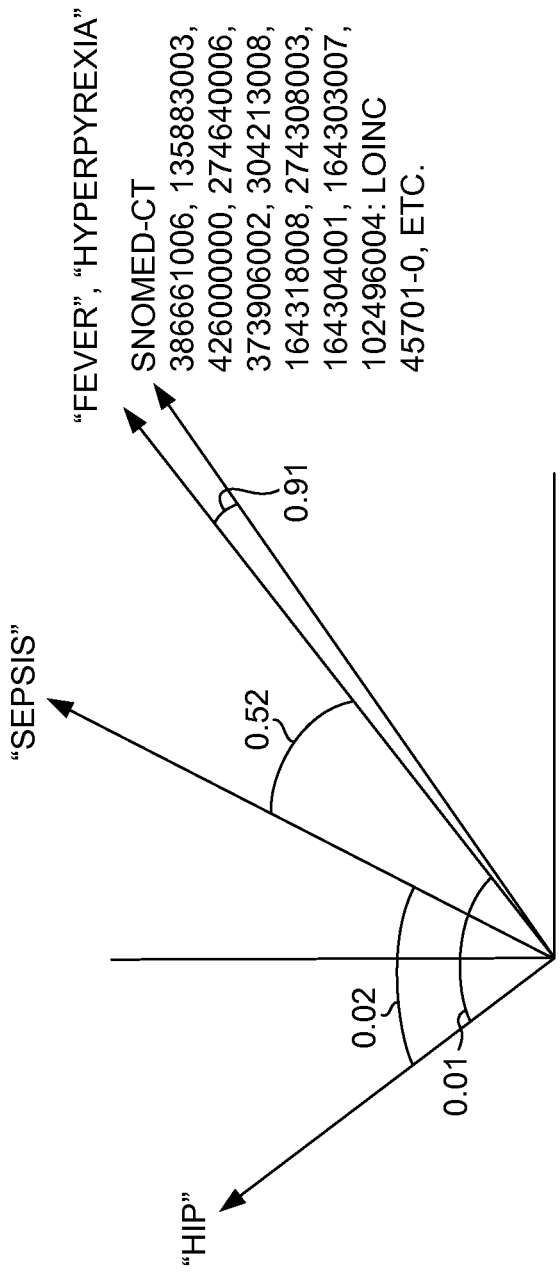
FIG. 6 illustratively depicts an example of terms projected into LS space for measuring semantic similarity.

FIG. 6 illustratively depicts an example of terms projected into LS space for measuring semantic similarity using Salton's cosine. In the example of FIG. 6, it can be seen that the projections shown for Fever, hyperpyrexia and the SNOMED-CT codes (such as 386661006, for fever)—all of which are substantially the same terms—have a Salton's cosine determined as 0.90. These projections are very close to each other, unlike, say, the projections for the terms "hip" and "fever"—two terms which are not similar—which are appear almost 90 degrees apart and have a Salton's cosine of 0.01, indicating no semantic similarity.

Continuing with method 200 of FIG. 2, some embodiments of the invention take advantage of statistical properties of distributions of the terms' values in such a manner that smaller sample sizes may be used to establish linkages with acceptable statistical power and low false-negative error rates.

A term-frequency vector Wi for a document or record i, may be expressed as: $W_i=[w_{1i}, \ldots, w_{ni}]^t$ where each element $w_{ji}$ denotes the frequency with which a given term, morpheme, or code j occurs in the record i.

Similarly, a weighted term-frequency vector Ai for the same $i^{th}$ record may be defined as: $A_i=[a_{1i}, \ldots, a_{ni}]^t$ where each element aji denotes a normalized frequency defined further as: $a_{ji}=L(w_{ji})G(w_{ji})$, and further where L is a 'local' weighting function for term j in document i and G is a corpus-wide 'global' weighting function for term j. During its creation, each such weighted term-frequency vector Ai may be normalized by its length $|A_i|$. During subsequent processing, embodiments may utilize either the original term-frequency matrix or the normalized matrix, but there are advantages for utilizing normalized matrix A. For example, in embodiments with a normalization step, which might include recalculating all term-frequencies, referenced to the term which has maximum frequency and whose frequency is set equal to 1.00, the chance that the subsequent steps will yield false-hit or false-miss errors from frequency-skewed data is minimized.

With reference to method 200, at a step 210 the use-case context or 'topic' and case-control dependent (endpoint) variables are determined. For example, a representative use-case is the determination of record sets across coding systems that document the presence of sepsis among adult patients represented in two or more encoding systems. In some embodiments, a selection of use-case context and case-control dependent variables is carried out by a user or analyst through manager 140, and in some embodiments, the determination is carried out or facilitated by software services of stack 121, such as one or more software agents.

At a step 212, independent variables associated to the use-case are determined. For example, for a use-case of sepsis detection in adult patients, relevant independent variables might be determined to be temperature, white blood cell count, and heart rate. In an embodiment, a plurality of column variables 1, . . . M are selected that are pertinent to the use-case determined in step 210. In some embodiments, this involves the use of operational data store, such as data store 125, that contains the records for one or more encoding systems. As with preceding step 212, in some embodiments, independent variables associated with the use-case may be selected, or confirmed, by a user/analyst through manager 140. In some embodiments, software services or a software agent determines the associated variables based on the use-case context or topic determined in step 210. In some embodiments, a software service or agent presents a user with a set of independent variables based on the use-case, and the user then selects or confirms the variables through a user interface of manager 140.

At a step 214, bind provisional mappings of the variables, in the EHR systems 1, . . . N in which linkages are sought. By way of example and not limitation, in a first encoding, the temperature field may be determined to be the "temperature" record and linked to field "TEMP" of a second encoding. In some embodiments, the EHR systems being mapped may be accessed by software services or software agents of stack 121 operating on computer system 120.

At a step 216, a sample of database records and/or documents containing the selected variables' values is extracted from the EHR systems (or other systems) being mapped. In some embodiments, this step entails extraction of structures discrete elements from relational databases, and may further entail parsing of unstructured text. In some embodiments, automated text parsing is facilitated by software agents or code engines such as Discern nCode (Registered Trademark), developed by Cerner Corporation; CodeFinder-Auto (Registered Trademark) developed by 3M Corporation; CodeRyte CodeAssist (Registered Trademark) developed by CodeRyte; Health Language LEindexer (Registered Trademark) developed by Health Language; PlatoCode (Registered Trademark); L&C NV FastCode (Registered Trademark) developed by L&C (Language and Computing); or MedLEE (Registered Trademark) developed by Columbia University. In some embodiments, step 216 extracts cases rows, variables values for column vectors 1, . . . P.

At this point of the example embodiment of method 200, records have been obtained that contain at least two encodings for documenting an event, such as the medical condition of sepsis. Some embodiments partition the set of records in the two encoding systems to provide a means of verifying the experimental success of a final mapping. For example, assume a global database of a first encoding being the set of records E1. A partition may be defined that divides E1 into sets E1a and E1b. Some embodiments define partition E1a as a small and manageable sample for evaluating the mappings from the first encoding system (encoding 1) to the second encoding system (encoding 2). The partition E1a may be further divided into subset E1a1 and E1a2, where E1a1 is a set of data where the event is known to be present at a first level. For example E1a1 might be all the patients in partition E1a which are known to have sepsis. Further, some embodiments may involve a range of levels of a condition such as mild, chronic, and severe. Some embodiments may involve a range of levels of interest such as passing, category, persistent, or continual. Additionally, in some embodiments, E1a2 operates as a control group representing patients having a second level of the event. For example E1a2 might represent the records in a control group that is known not to have sepsis. In embodiments, the partition E1b represents a large quantity of records in a first encoding system where the level of an event is generally not known.

In some embodiments, a partition is also defined that divides a set of records E2 corresponding to the second encoding system into subsets E2a and E2b. E2a represents a set of records present in the set of records E2 that contains a first subset E2a1 in which the condition is present to a first level, and a second subset E2a2 in which the condition is present to a second level. Some embodiments select E2a to be a small and manageable subset suitable for prototyping a mapping system. In embodiments, the partition E2b may represent a large quantity of records in a second encoding system where the level of an event is not generally known.

In some embodiments, a provisional mapping is formed based on a prototype evaluation of subsets E1a and E2a by method 200. For example, after reviewing false positives and false negatives, the mapping may be modified in an attempt to account for unacceptable errors that are encountered. In some embodiments, the method 200 may be repeated to verify a final mapping. Method 200 may be then repeated again on the sets E1b and E2b, in some embodiments. Additionally, in some scenarios, record sets E1 and E2 are restricted patients that fit a certain set of criteria chosen to eliminate patient variability. Such embodiments limit the patients to a certain class that are likely to have similar characteristics such as resident adult patients.

Continuing with method 200, at a step 220, optionally one of the EHR systems is designated as a "gold standard" whose nomenclatures will be used as a basis for cross-mapping terms from each of the other systems. Typically the most stable system for encoding the use-case or event is chosen as the standard set. This approach allows an expected event occurrence rate to be estimated in the E1 set. Such a rate is then available to serve as a check on the rate of occurrence of the event present in the E2 set.

At a step 230, the values of variables in the record sets being processed are cleaned and, in some embodiments, mathematically transformed. For example, in some embodiments, the alpha values are converted to a single case (such as convert to upper before evaluation). In another example, a gender value may be used to convert values such as male/M/man to 'male' and female/F/woman to 'female'. In some embodiments, cleansing variables includes removing outliers, for example, dropping the lower 5% and the top 5% of values for temperatures.

Figure 4A:
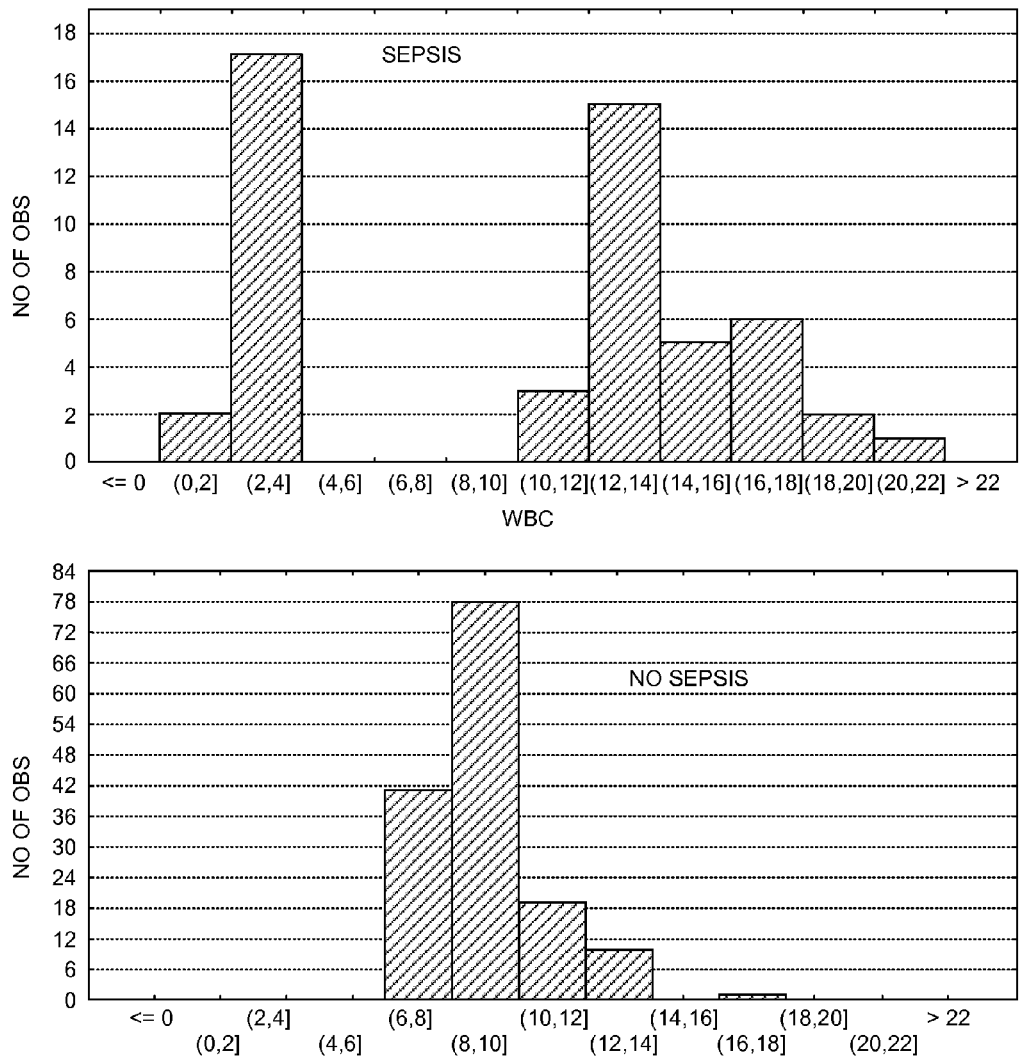
Figure 4B:
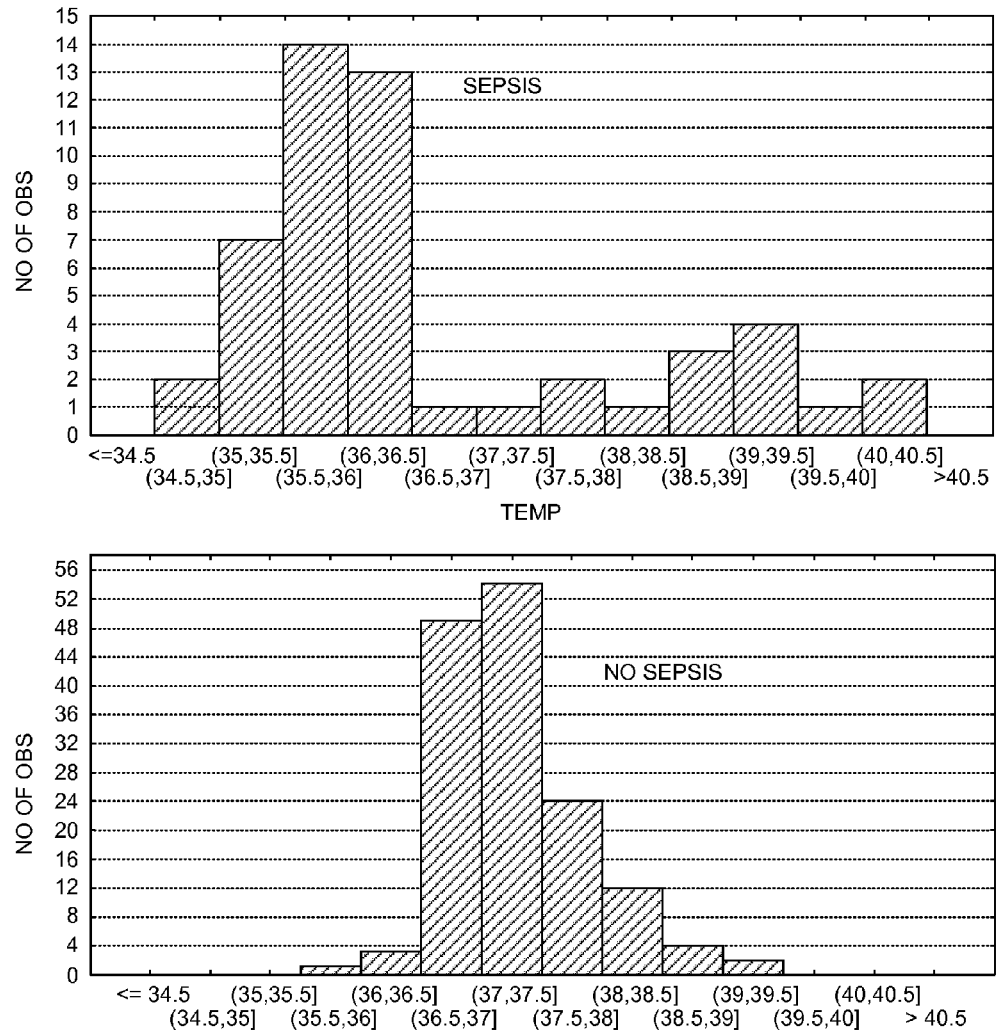

Some embodiments transform the numerical value of a record through a square-root transform logarithmic transform, or similar statistical transformation, which can improve the quality and accuracy of the subsequent LSA mappings. Some embodiments review the distributions of variables for different levels of presence of an event. (For example, some embodiments may compare distributions for sepsis, as shown in the example of FIGS. 4A, 4B, and 4C.) In some embodiments, if the distributions are not similar, then the matter may be flagged for review or investigated to determine possible problems with the mapping.

At a step 232, dimensionality is reduced by generating a decision-tree classifier for the endpoint(s) or by applying other statistical clustering methods, such as those presented in the R-project. In embodiments using a decision-tree classifier, a rulebase is generated by decision tree induction. In some embodiments, this is facilitated by services 126 such as Weka, rWeka (a WEKA package for use with the R system), Class J48, or C5 DTI Quinlan algorithm) of services 126. The induction of a decision tree generally has the effect of making the data coarser, as opposed to continuous. This provides fewer cases to be considered for later stages of processing. Dimensionality is effectively reduced.

In some embodiments, a number of trials are performed using a decision-tree induction (DTI) rulebase, wherein trials include one or more decision criteria for separating a class into classifications. Turning briefly to FIG. 3A-3C, a DTI example is shown for sepsis. Each trial includes a one or more decision criteria for separating a class into classifications, here sepsis and no sepsis. For example, trial 1 of FIG. 3A uses heart rate (HR) at 88 beats per minute as a decision criterion. In trial 2, temperature (TEMP) greater or less than 36 degrees Celsius is used, and in Trial 4, both white blood cell count (WBC) and heart rate (HR) are used for one decision criterion. Embodiments perform a number of trials attempting to separate the cases into the classifications. For example, trial 1 includes class 0 implying no sepsis, which is also the default classification, and class 1 implying that sepsis is present. Rule 1 of Trial 1 (shown as "Rule 1/1") indicates that for a HR less than or equal to 88, classify as class 0 (no sepsis). Similarly rule 2 of trial 1 (shown as "Rule 1/2") indicates that for a HR greater than 88, classify as class 1 (sepsis).

In this example, each rule consists of: (a) a rule number, such as "Rule 1/1," which serves to identify the rule, and which may be arbitrary and generated automatically by the algorithm; (b) statistics that provide a summary of the performance of the rule, such as "(N, lift x)" or "(N/M, lift x)", where N represents the number of training cases covered by the rule and M (if it appears) represents how many of them do not belong to the class predicted by the rule; (c) one or more Boolean conditions that must all be satisfied if the rule is to be applicable, for example, heart rate less than or equal to 88 beats per minute, as described above for Rule 1 of Trial 1, or "HR<=88"; (d) a class predicate asserted by the rule; and (e) a confidence value between 0 and 1 that indicates the confidence or certainty with which this predicate classification or prediction is made, based on the training dataset. For example, for Rule 1/1, the class 0 prediction has a confidence value of 0.968.

The accuracy of the rule may be estimated by the Laplace ration (N−M+1)/(N+2). An information-theoretic 'lift' metric x is the result of dividing the rule's estimated accuracy by the relative frequency of the predicted class in the training set. The lift associated with each rule is given as:

$$\mathrm{lift}(X \to Y) = \frac{conf(X \to Y)}{p(Y)}$$

An example of sepsis-related data from multiple EHR systems used for generating the example DTI of FIGS. 3A-3C is provided in table discussed in connection to step 252. Continuing with example method 200, at a step 234, values of the original raw variables are transformed into categorical datatypes by applying the decision tree(s) or other classifier cut-points determined in step 232. (In embodiments, a categorical datatypes is a multinomial where the cardinality of the categorical datatype is greater than or equal to 2.) For example, white blood count (wbc) may be transformed into a verbal string representing the level such as "wbc very low", "wbc moderately low", "wbc moderately high", "wbc high". As a more specific example, a DTI rule might specify that a wbc >10,500 leukocytes/uL is classified as "wbc high." Thus when applied to a raw variable having a wbc of 10,599, the value of the raw variable is transformed in to "wbc high."

At a step 240, a term-list comprised of the transformed multinomial values for the variables is created. In some embodiments, the term-list is a master term-list comprising transformed multinomial values for each variable, which represents a possible set of enumerations/values for a concept. For example, some values are common to many concepts; eye color can be classified as black, brown and blue. Similarly, another concept like hair color should not have blue in its term-list. Therefore, by creating an association between a known concept and its possible value set, embodiments are further able to differentiate between similar valued concepts. In some embodiments, this term-list is created and stored in data store 125.

At a step 244, determine cases and column vectors using the term-list created in step 242. In some embodiments, this step comprises assembling and programmatically rewriting copies of database records and documents, substituting the multinomial values for the original terms or morephemes present in the original documents or records and inserting a token (such as "?") representing the status of 'unknown' for each variable whose value was absent (for example, not measured, not remarked upon, or not instantiated) in the original.

At a step 250, the transformed and/or rewritten records and documents from step 244 are converted into a set of machine-readable text-matrices (such as [1,1] . . . [N,P], for systems 1, . . . N (see step 214), and column vectors 1, . . . P (see step 216)) suitable for applying the LSA algorithm.

At a step 252, subject the set of text-matrices from step 250 to LSA. In some embodiments, the LSA induces an LS space (or LSA space) which may be stored as an LSA spacebase in data store 125.

In some embodiments, the LSA algorithm applied in step 252 employs matrix singular value decomposition (SVD). Given matrix A of dimensions m×n, the system computes:

$$A = U\Sigma V^T$$

where U is an m×n orthonormal matrix whose columns are left-singular vectors, $\Sigma = \text{diag}(\sigma_1, \ldots, \sigma_n)$ is an n×n diagonal matrix whose diagonal elements are non-negative singular values sorted in descending order, V is an n×n orthonormal matrix whose columns are right-singular vectors and. $V^T$ is the transpose of V. If rank(A)=r, then F satisfies the relationship:

$$\sigma_1 \geq \sigma_2 \geq \ldots \sigma_r \geq \sigma_{r+1} = \ldots, = \sigma_n = 0$$

AS described above, the application of SVD to matrix A induces a reduced-dimensionality mapping between the m-dimensional space spanned by the weighted term-frequency vectors and the r-dimensional singular vector space with all of its axes linearly independent. This mapping projects each $i^{th}$ column vector in matrix A to column vector $\psi_i = [v_{i1}, \ldots, v_{ir}]^T$ in $V^T$, and maps each $j^{th}$ row vector in matrix A to row vector $\phi_j = [u_{j1}, \ldots, u_{jr}]$ in matrix U. The SVD step in the LSA algorithm enables the system to derive a latent semantic structure of each record in the corpus.

Optionally in some embodiments, the sampled corpora of documents and records may be aggregated or concatenated on a per-system basis, and the resulting per-system aggregates or composites can then be subjected to LSA processing as large super-documents. This arrangement enables more convenient ascertainment of synonymy between pairs of systems with regard to a topic, while still permitting ascertainment of synonymy between pairs of terms or codes across systems.

larity is determined using Pearson's correlation coefficient, Salton's cosine measure, a lexical distance metric, or other suitable similarity metric. In some embodiments, the output of the LSA algorithm in step 252 is first transformed to as.textmatrix format or a document-term matrix format (or a similar suitable format) for facilitating performing a comparison between terms and documents. The as.textmatrix format provides an LS space, as determined in the LSA step 252, in textmatrix format where rows are terms and columns are documents.

In some embodiments, the 'mxr' elements of the output matrix of the LSA determined in step 252 are evaluated using a similarity measure for comparing each element to a threshold taken to denote synonymy, at step 260. In illustrative embodiments, Pearson's correlation coefficient or Salton's cosine are used, although other lexical distance metrics or similar criteria for measuring similarity may be used. In the embodiments utilizing Pearson's correlation coefficient a threshold of synonymy is preferably greater than 0.62 and more preferably greater than 0.80, as described in the examples associated with FIGS. 5A, 5B, and 6. In some embodiments, the threshold value is empirically established as denoting synonymy for the particular context of the selected use-case or topic.

Salton's cosine is an alternative to Pearson's Correlation Coefficient one that is insensitive to the presence of zeroes. Unlike Salton's cosine measure, Pearson's r has a very long history in multivariate statistical theory and conveniently allows for negative values as well as positive values. The differences between using Pearson's Correlation Coefficient and Salton's cosine are relatively small in practice, since the

| Universal Concept Identifier Key | Concept Name | System_2 | System_2 | System_N |
|---|---|---|---|---|
| 1234561 | White Blood Count | CPT-4::85048 | LOINC::6690-2 | "WBC", "Leucocytes" |
| 1234562 | Oral Temperature | "TEMP" | LOINC::8331-1 | "Temp, oral" |
| 1234563 | Systolic Blood Pressure | SNOMED::271649006 | LOINC::55284-4 | "BP, sys", "SBP" |
| 1234564 | Heart Rate | SNOMED::364075005 | LOINC::8867-4 | "HR" |
| 1234567 | Sepsis | ICD9::995.91,995.92 | ICD10::A40.*, A41.* | "Septicemia", ∃(result(blood_culture), "positive") |

As described above, an associated feature of some embodiments is an apparatus and algorithmic method for establishing a reduction in dynamic range of the retained terms and variables, taking advantage of statistical distributions of variables' values that are extant within the corpus of database records and documents. Any of a variety of statistical clustering and transformation methods may be used as will be appreciated by those practiced in the art. However, in some preferred embodiments a decision-tree induction algorithm (such as that developed by Quinlan) is utilized. Optionally and/or alternatively, additional statistical transformations (for example, logarithmic transform, square-root transform, or similar transformations) may be applied to one or more of the variables contributing to a given analysis and mapping operation. These pre-processing steps have the effect of improving the quality and accuracy of the subsequent LSA mappings.

At a step 255, a measure of similarity is determined for the relevant pairs of variables emanating from the different systems. In some embodiments, a quantitative measure of simicorrelation coefficient r can also be considered as a cosine between normalized vectors. But vector normalization is sensitive to the presence of "zeroes" (null occurrences in frequency matrixes correlating terms and documents), although this can be ameliorated as needed by logarithmic or other transformations of the raw data. Some studies have questioned the reliability of Pearson's Correlation Coefficient r as a similarity measure in the presence of zeroes in matrices in which variables are tabulated, noting that zeroes should spuriously augment measures of the variables' statistical association or similarity, but these same studies have shown empirical examples where zeroes can in some instances depress the correlation coefficient between variables. Nevertheless, the problem with the zeroes can be solved by applying logarithmic or other transformations to the data. As described above, the illustrative example embodiment utilizes a Pearson correlation coefficient and a threshold of r>0.62, at step 260, as a criterion for establishing synonymy between pairs of terms or morphemes.

Where the similarity-measurement threshold comparison performed in step 260, determines that a similarity measurement satisfies the threshold, method 200 proceeds to a step 270. At step 270, a synonymy {I,j} is accepted as a provisional or final mapping. In some embodiments, the provisional mapping or final mapping is stored in data store 125. Where the similarity measurement threshold comparison does not satisfy the threshold in step 260, the method proceeds to a step 275. At step 275, the {I,j} variables, which may represent a homonymy or polysemy may be flagged or enqueued for review. In some embodiments, at step 275, particularly those that involve a relatively high cost of human review compared to the cost associated with false-miss errors to accurately detect synonymy, method 200 quiesces and moves on to the next pair of variables, instead of flagging or enqueuing the variables for review. In some embodiments, a second similarity-measurement threshold comparison is performed with a lower threshold. In these embodiments, where the threshold is satisfied, variables {I,j} may be flagged or enqueued for review; but where the second similarity measurement threshold comparison does not satisfy the threshold, method proceeds to the next pair of variables.

Example 1

Embodiments of method 200, which include text pre-processing and LSA methods and subsystems, have been reduced to practice using a server cluster running the Linux operating system, Java Virtual Machine and Eclipse stack, Java Agent Development stack (JADE), Quinlan's C5 (or J48 Weka) decision-tree induction software, the open-source statistical software package R, and the R modules LSA, RWeka, and Snowball. Parsing of unstructured text was performed using Discern nCode® to transform the matched variable descriptors into SNOMED-CT codes. In these embodiments, retrieval of structured discrete items was performed using Discern Explorer™ operating on Cerner Millennium™ systems, some of which had been mapped using Cerner's Controlled Medical Terminology (CMT™) universal concept identifier ontology and some of which had not been mapped.

In this example, fifty-one subjects cared for by two hospitals with a diagnosis of sepsis and 149 control subject in-patients with no known risk factors for sepsis were considered. The source hospitals' information systems employed disparate coding systems for white blood count, blood culture, microbiologic organisms isolated from cultured blood, temperature, heart rate, systolic blood pressure, diagnosis (of sepsis in this example), and other variables pertinent to the classification domain.

FIGS. 3A-3C, which are discussed above in connection to step 232, illustratively show a DTI example for example 1. FIGS. 4A-4C, illustratively show DTI example statistical distributions of sepsis occurrence for example 1.

Application of embodiments of method 200, in example 1, were able to correctly resolve 100% of the true synonymous term mappings between the two systems and exhibited 0% false-positive and 0% false-negative classifications. Furthermore, in this example, Salton's cosine provided a more robust measure of pairwise synonymy of systems (documents) and the term bindings that those systems manifest, while Pearson's correlation provided a more robust measure of global cross-system synonymy of terms (codes) in the latent semantic structures in which the terms occur.

In some embodiments, such as those using a multi-agent operating system where software agents carry out the steps of method 200 in parallel, a minimum number of variables may be required for accurately predicting the mappings. Moreover, a high dimensionality may require parallelization via software agents due in part to memory/pagefile implications on a per-core basis.

Figure 7:
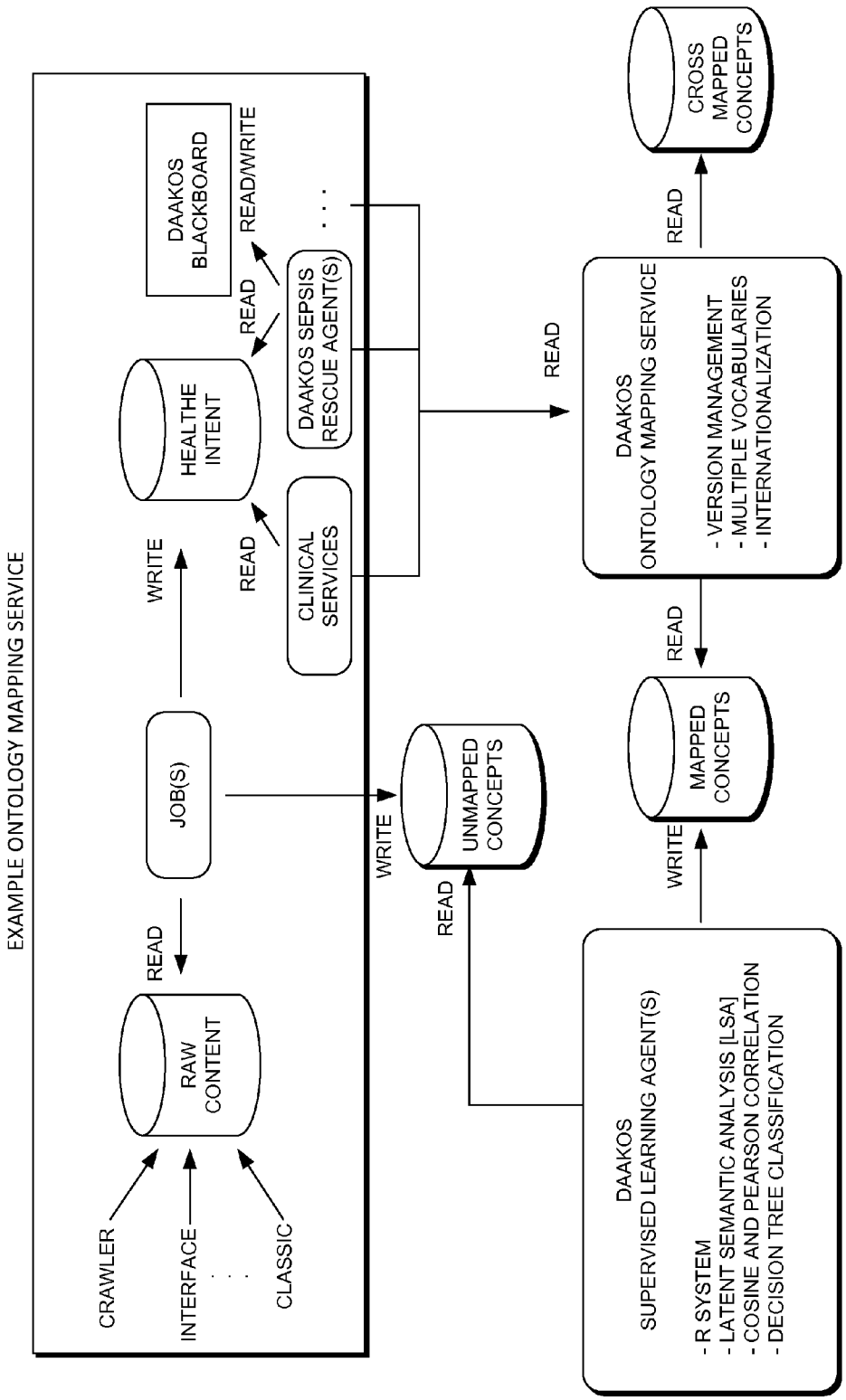
FIG. 7 illustratively provides an example embodiment of an ontology mapping service.

Turning now to FIG. 7, another example embodiment of the invention is provided in the form of an ontology mapping service. This example embodiment operates with an adaptive multi-agent operating system 129 (of FIGS. 1A and 1B), referred to in FIG. 7 as DAAKOS (Trademark). In this example embodiments, software agents, (referred to as supervised learning agents) facilitate carrying out LSA, similarity measurements via Salton's Cosine, Pearson Correlation Coefficient, or other metric, decision tree classification, and other software services of stack 121. Some embodiments apply a crawler, which can be embodied as a software agent or software routine, for combing EHR systems, reference systems, or other systems having terms to be mapped to or from. Such a crawler can be used to facilitate identifying and incorporating new vocabularies as they become available. In some embodiments, the crawler operates similar to the way a search-engine crawler crawls (or navigates) through content online to indexing the content for a search engine.

Some embodiments of the ontology mapping service, apply a 'cloud' strategy based on the most appropriate vocabulary for the particular scenario being mapped. Such embodiments can support certain concepts, which may be present in standard vocabularies. For example, some scenarios may support coarse concepts or variables, such as Temperature, while in some instances more granular variables or concepts, such as Ear Temperature, may be desired. Furthermore, some embodiments can apply a machine learning algorithm to match client vocabulary with the data in the 'could'. Thus, for example, where a new record or document, which may take the form or research data, or an entire record system, such as an international systems or system from another country, becomes accessible on the cloud, the information can be mapped to existing vocabulary.

Although the invention has been described with reference to the embodiments illustrated in the attached drawing figures, it is noted that substitutions may be made and equivalents employed herein without departing from the scope of the invention as recited in the claims. For example, additional steps may be added and steps omitted without departing from the scope of the invention.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. For example, while many of the embodiments described above concern health care contexts, some embodiments may be suitable for financial or operational contexts, including company codes and operational codes, where two or more systems using different terms or vocabularies are present.

It will be understood that certain features and subcombinations are of utility and may be employed without reference to other features and subcombinations and are contemplated within the scope of the claims. Not all steps listed in the various figures need be carried out in the specific order described. Accordingly, the scope of the invention is intended to be limited only by the following claims.

What is claimed is:

1. A non-transitory Computer-readable media having computer-executable instructions embodied thereon that when executed provide a method for facilitating decision support by determining nomenclature linkages between variables in databases that have different ontologies, the method comprising:
- identifying a first set of documents from a first record system having a first ontology;
- identifying a second set of documents from a second record system having a second ontology that is different than the first ontology;
- determining a use-case present in the first and second sets of documents;
- determining a set of variables relevant to the use-case;
- receiving from the first set of documents, a first document containing at least one first-document variable from the set of variables; wherein each first-document variable has a first-document value associated with it;
- receiving from the second set of documents, a second document containing at least one second-document variable from the set of variables;
  - (1) wherein the second-document variable has a second-document value associated with it, and
  - (2) wherein the second-document variable is also contained in the first document;
- based on the determined use-case and set of variables, generating a decision-tree classifier;
- for each first-document variable contained in the first document, applying the decision tree classifier to transform the first-document value associated with the first-document variable to a categorical datatype;
- for each second-document variable contained in the second document, applying the decision tree classifier to transform the second-document value associated with the second-document variable to a categorical datatype;
- based on the categorical datatypes of the first document and the categorical datatypes of the second document, generating a set of textmatrices;
- applying latent semantic analysis to the set of textmatrices to determine a latent semantic space associated with the at least one first-document variable and the at least one second document variable;
- specifying a threshold of similarity;
- for a first comparison-variable, from the at least one first-document variables associated with the latent semantic space:
- determining a measure of similarity to a second-comparison variable from the at least one second-document variables associated with the latent semantic space:
- performing a comparison of the measure similarity to the threshold; and
- based on the comparison, determining that the measure similarity satisfies the threshold, associating the first comparison variable with the second comparison variable, and designating the association as a synonymy, wherein the threshold is satisfied if the measure of similarity is greater than the threshold.

2. The computer-readable media of claim 1, wherein the measure of similarity is determined using Salton's cosine.

3. The computer-readable media of claim 2, wherein the threshold is specified as 0.62.

4. The computer-readable media of claim 2, wherein the threshold is specified as 0.8 and further wherein the association is designated as a strong synonymy.

5. The computer-readable media of claim 1, wherein the measure of similarity is determined using Pearson's correlation coefficient.

6. The computer-readable media of claim 1, wherein the first record system is a first electronic health record system for a first hospital, and the second record system is a second electronic health record system for a second hospital.

7. The computer-readable media of claim 1, wherein the first record system is designated as a "gold standard."

8. The computer-readable media of claim 1, wherein applying latent semantic analysis includes singular value decomposition.

9. The computer-readable media of claim 1, wherein the first document comprises a set of records from the first record system, and the second document comprises a set of records from the second record system.

10. The computer-readable media of claim 1, further comprising displaying to a user the first comparison variable and the second comparison variable as a designated synonymy.

11. The computer-readable media of claim 10, further comprising receiving an indication from the user confirming or rejecting the designated synonymy.

12. A method for facilitating decision support by determining nomenclature linkages between variables in databases having different ontologies, the method comprising:
- identifying a first set of documents from a first record system having a first ontology;
- identifying a second set of documents from a second record system having a second ontology that is different than the first ontology;
- determining a use-case present in the first and second sets of documents;
- determining a set of variables relevant to the use-case;
- receiving from the first set of documents, a first document containing at least one first-document variable from the set of variables; wherein each first-document variable has a first-document value associated with it;
- receiving from the second set of documents, a second document containing at least one second-document variable from the set of variables;
  - (1) wherein the second-document variable has a second-document value associated with it, and
  - (2) wherein the second-document variable is also contained in the first document;
- based on the determined use-case and set of variables, generating a decision-tree classifier;
- for each first-document variable contained in the first document, applying the decision tree classifier to transform the first-document value associated with the first-document variable to a categorical datatype;
- for each second-document variable contained in the second document, applying the decision tree classifier to transform the second-document value associated with the second-document variable to a categorical datatype;
- based on the categorical datatypes of the first document and the categorical datatypes of the second document, generating a set of textmatrices;
- applying latent semantic analysis to the set of textmatrices to determine a latent semantic space associated with the at least one first-document variable and the at least one second document variable;
- specifying a threshold of similarity;
- for a first comparison-variable, from the at least one first-document variables associated with the latent semantic space:

determining a measure of similarity to a second-comparison variable from the at least one second-document variables associated with the latent semantic space:

performing a comparison of the measure similarity to the threshold; and based on the comparison, determining that the measure similarity satisfies the threshold, associating the first comparison variable with the second comparison variable, and designating the association as a synonymy, wherein the threshold is satisfied if the measure of similarity is greater than the threshold.

13. The method of claim 12, wherein the measure of similarity is determined using Salton's cosine.

14. The method of claim 13, wherein the threshold is specified as 0.62.

15. The method of claim 12, wherein the measure of similarity is determined using Pearson's correlation coefficient.

16. The method of claim 12, wherein the first record system is a first electronic health record system for a first hospital, and the second record system is a second electronic health record system for a second hospital.

17. The method of claim 12, wherein applying latent semantic analysis includes singular value decomposition.

18. The method of claim 12, wherein the first document comprises a set of records from the first record system, and the second document comprises a set of records from the second record system.

19. A non-transitory Computer-readable media having computer-executable instructions embodied thereon that when executed provide a method for discovering and validating latent relationships in data, the method comprising:

determining a use-case context;

determining a plurality of variables associated with the use case;

based on the determined context and plurality of variables, generating a decision-tree classifier;

receiving a plurality of documents from two or more record-keeping systems; wherein each document contains one or more document variables of the determined plurality of variables, and wherein the received plurality of documents comprises a set of documents;

for each document in the set, applying the decision tree classifier to transform a value associated with each variable contained in the document into a categorical datatype;

based on the set of documents, generating a set of textmatricies;

applying latent semantic analysis to the set of textmatrices to determine a latent semantic space;

specifying a threshold of similarity;

for a first-document variable, from a first document, associated with the latent semantic space:

determining a measure of similarity to a second-document variable, from a second document, associated with the latent semantic space;

performing a comparison of the measure similarity to the threshold; and based on the comparison, determining that the measure similarity satisfies the threshold, associating the first-document variable with the second-document variable, and designating the association as a synonymy, wherein the threshold is satisfied if the measure of similarity is greater than the threshold.

20. The computer-readable media of claim 19, wherein the measure of similarity is determined using Salton's cosine.

* * * * *